June 28, 1960
P. S. IAMS
2,942,502
REAMER
Filed July 29, 1957
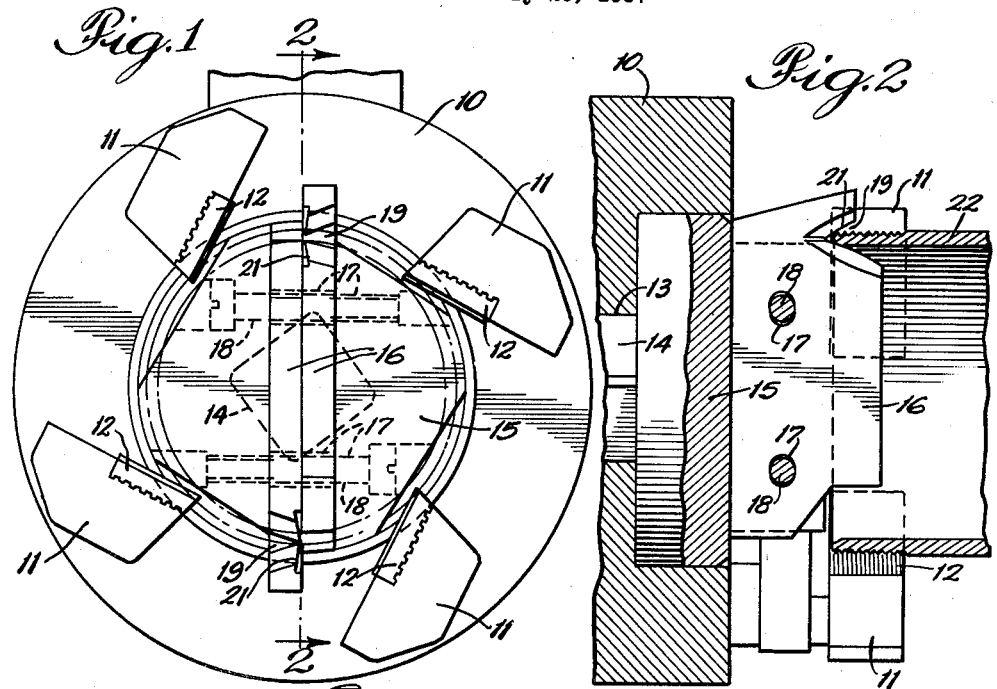
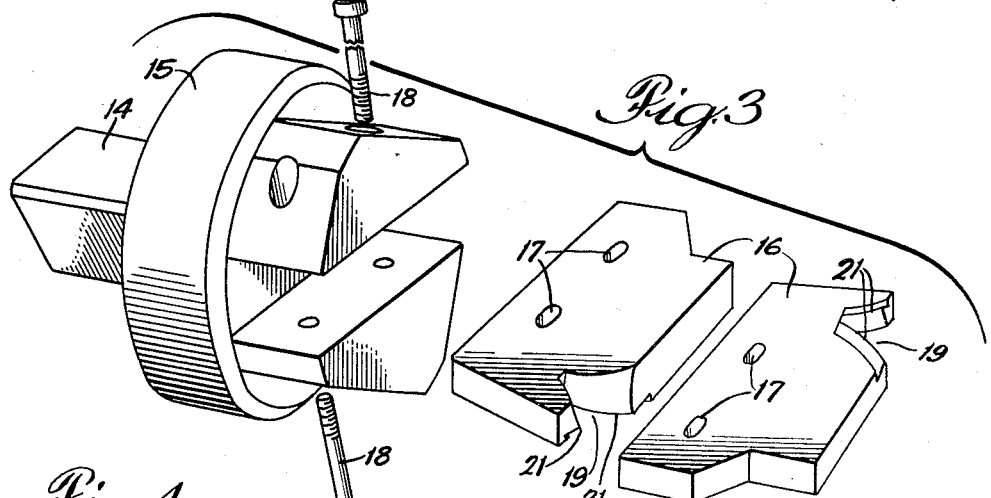
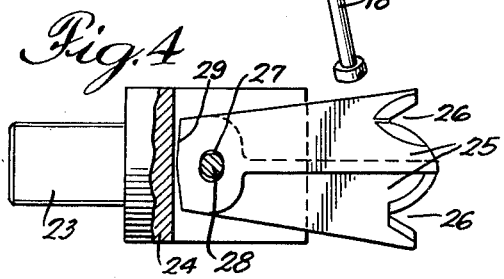
INVENTOR:
Paul S. Iams,
BY Bair, Freeman & Molinare
ATTORNEYS.

United States Patent Office 2,942,502
Patented June 28, 1960

2,942,502

REAMER

Paul S. Iams, Trevor, Wis., assignor to Chicago Nipple Mfg. Co., Oak Park, Ill., a corporation of Delaware Filed July 29, 1957, Ser. No. 674,872

2 Claims. (Cl. 77—73)

This invention relates to reamers and more particularly to reamers and chamfering tools for use with threading heads for pipe and the like.

In threading pipes and tubes it has been customary to use a threading head carrying a plurality of chasers to cut threads on the pipe and to provide a reamer in the threader head to ream and chamfer the end of the pipe during a threading operation. Such reamers have commonly been flat blades mounted in a holder in the head for limited floating movement and form adjacent the opposite ends thereof with cutting notches for simultaneously reaming and chamfering the end of the pipe.

In the use of such reamers difficulties are encountered due to variations in the pipe diameter and wall thickness. Since the spacing in the cutting notches is fixed they can properly engage a pipe of only one exact size and any slight variation in the pipe diameter causes the reamer to tilt so that it cuts at one side only. Furthermore, since the cutting edges are formed on opposite faces of the plate or blade at its opposite ends they do not cut on a diameter of the pipe so that variations in the pipe size will affect the rake and relief of the tool and produce improper cutting.

It is one of the objects of the invention to provide a reamer in which the cutting surfaces will accurately engage pipes of varying diameters.

Another object is to provide a reamer in which the cutting edges cut on a diameter of the pipe to provide substantially constant rake and relief regardless of variations in pipe size.

According to one feature of the invention, the reamer is formed by a pair of blades mounted in overlapping face-to-face relationship for limited movement relative to each other and each blade is formed with a cutting portion adjacent one end only. In this way, each blade cuts at one side of the pipe only and the blades can center themselves accurately relative to the pipe. Furthermore, the cutting edges may be formed on the facing surfaces of the blades so that they will lie substantially in a plane passing through the pipe axis.

The above and other objects and features of the invention will be more readily apparent from the following description when read in connection with the accompanying drawing, in which:

Figure 1 is a face view of a threading head equipped with a reamer embodying the invention;

Figure 2 is a section on the line 2—2 of Figure 1;

Figure 3 is a disassembled view of the reamer and reamer holder and

Figure 4 is a side view with parts broken away and in section in an alternative form of reamer and reamer holder embodying the invention.

The reamer of the present invention is adapted to be used with a conventional threading head of the type including an annular body 10 on which a plurality of chasers 11 are mounted on annular array. The chasers 11 are formed with cutting surfaces 12 for cutting threads on the exterior of a pipe or tube and are movably mounted on the body 10 for inward movement to a cutting position, as shown in Figure 1, and for outward movement to a release position in which the threaded pipe can be removed axially from the cutter without unthreading it.

In conventional heads of the type disclosed a reamer or combined reaming and chamfering tool is carried by a holder supported centrally of the head axially inward of the chasers to engage the end of a pipe near the end of the threading operation and to ream and chamfer the pipe. As shown, the head is provided with a central bore 13 to receive a shank 14 of a reamer holder having a body portion 15 fitting into a recess in the head and formed with a transverse diametrical slot in its outer face. The end of the holder body 15 terminates axially inward from the inner edges of the chasers so that it will not be engaged by the end of a pipe being threaded except at the other end of the threading operation and the holder may be shiftable axially in the cutting head if preferred to drop the head to its open position at the end of the threading operation, as is conventional. To insure rotation of the reamer holder with the threading head the bore 13 and shank 14 may be made non-circular, such as the square shape shown.

The holder 15 is adapted to receive cutting blades for reaming and chamfering the pipe and in the conventional construction a single blade is employed which is mounted for limited tilting movement in the slot in the holder and is provided with a pair of cutting notches opposite its adjacent ends. According to the present invention, the reamer comprises two flat blades 16 which may be identical and which are mounted in overlapping face-to-face relationship in the slot in the holder. To mount the blades they are provided with elongated openings 17 therethrough and fastening screws 18, or the like, may extend through openings in the holder, as seen in Figure 3, and loosely through the openings 17 to secure the blades in the holder with a limited amount of endwise movement relative to each other.

Each blade is provided adjacent one end with a cutting notch, indicated generally at 19, the notches being tapered away from the meeting faces of the blades to terminate in cutting edges 21 lying substantially in a common plane at the meeting faces of the blades and extends diametrically across the pipe to be threaded.

In use, the holder and cutting blades may be mounted in the cutting head, as shown in Figures 1 and 2. When a pipe or similar piece to be threaded, as shown at 22, is fed into the threading head, the cutters will form an exterior head therein, as illustrated in Figure 2. Near the end of the threading operation, the end of the pipe will engage the notches 21 in the reamer blades and the blades can move relative to each other a limited amount so that the cutting notches 19 on the blades will accurately engage the pipe to ream and chamfer the end portion thereof. It will further be noted that the cutting edges 21 lie at a diametrical plane through the pipe so that the desired degree of relief and rake will be provided even though there should be minor variations in the diameter of the pipe or the wall thickness thereof.

An alternative construction is illustrated in Figure 4 wherein the holder includes a shank 23 for insertion in the threading head and a main body portion 24 formed with a relatively deep diametrical slot, as shown. Two blades 25 are received in the slot in overlapping face-to-face relationship and each blade is formed with a cutting notch 26 near one edge, similar to the notches 19 of Figures 1 to 3.

To hold the blades in the holder, each blade is formed near the end thereof remote from the cutting notches with an opening 27 to receive loosely a pin or screw 28 carried by the holder. The ends of the blades adjacent to the holder may be given a slight V-shape, as shown at 29, to permit limited pivoting movement of the blades about the pin 28. This construction functions in substantially the same manner as that of Figures 1 to 3, except that instead of sliding relative to each other the blades 25 swing relative to each other about the pin or screw 28 so that the distance between the notches 26 can vary as necessary to accommodate variations in pipe diameters. Otherwise, the construction is substantially identical to that of Figures 1 to 3 and functions in the same manner.

While two embodiments of the invention have been shown and described herein, it will be understood that they are illustrative only and not to be taken as a definition of the scope of the invention, reference being had for this purpose to the appended claims.

What is claimed is:

1. A reamer for pipes and the like comprising a holder adapted to face the end of a pipe to be reamed in coaxial relation therewith and for rotation relative to the pipe, the holder having a diametrical groove in its face, and a pair of flat blades mounted in the groove in overlapping face to face relationship, each of the blades having at least one opening therethrough, and pins carried by the holder and extending loosely through the openings to permit limited movement of the blades relative to each other and to the holder parallel to the blade faces, each of the blades being formed with a cutting portion adjacent to one end only for cutting engagement with the end portion of the pipe.

2. A reamer for pipes and the like comprising a holder adapted to face the end of a pipe to be reamed in coaxial relation therewith and for rotation relative to the pipe, the holder having a diametrical groove in its face, and a pair of flat blades mounted in the groove in overlapping face to face relationship, and means pivotally connecting the blades within the holder for relative movement of the outer edge portions thereof parallel to their faces, each of the blades having a cutting portion adjacent to one end only for cutting engagement with the end portion of the pipe.

References Cited in the file of this patent

UNITED STATES PATENTS

| | | |
|---|---|---|
| 1,088,431 | Linehan | Feb. 24, 1914 |
| 1,122,315 | Schoengarth | Dec. 29, 1914 |
| 1,661,788 | Coibion | Mar. 6, 1928 |
| 2,057,842 | Nielsen | Oct. 20, 1936 |
| 2,748,631 | Neale | June 5, 1956 |